US012609626B2

(12) United States Patent
Weng et al.

(10) Patent No.: US 12,609,626 B2
(45) Date of Patent: Apr. 21, 2026

(54) CONTROL METHOD FOR RESONANT DUAL ACTIVE BRIDGE CONVERSION CIRCUIT, CONTROLLER, AND CONVERTER

(71) Applicant: HOYMILES POWER ELECTRONICS INC., Hangzhou (CN)

(72) Inventors: Bingwen Weng, Hangzhou (CN); Yi Zhao, Hangzhou (CN); Junxiong Wu, Hangzhou (CN); Yafeng Liao, Hangzhou (CN)

(73) Assignee: HOYMILES POWER ELECTRONICS INC., Hangzhou (CN)

( * ) Notice: Subject to any disclaimer, the term of this patent is extended or adjusted under 35 U.S.C. 154(b) by 180 days.

(21) Appl. No.: 18/711,905

(22) PCT Filed: Dec. 1, 2022

(86) PCT No.: PCT/CN2022/135959
§ 371 (c)(1),
(2) Date: May 21, 2024

(87) PCT Pub. No.: WO2023/098826
PCT Pub. Date: Jun. 8, 2023

(65) Prior Publication Data
US 2024/0339933 A1 Oct. 10, 2024

(30) Foreign Application Priority Data
Dec. 2, 2021 (CN) .......................... 202111457868.0

(51) Int. Cl.
H02M 3/335 (2006.01)
H02M 1/08 (2006.01)
H02M 1/088 (2006.01)

(52) U.S. Cl.
CPC ....... *H02M 3/33573* (2021.05); *H02M 1/083* (2013.01); *H02M 1/088* (2013.01)

(58) Field of Classification Search
CPC ... H02M 3/33573; H02M 1/083; H02M 1/088
See application file for complete search history.

(56) References Cited

U.S. PATENT DOCUMENTS 10,804,809 B1 * 10/2020 Yelaverthi ............... H02J 1/102
2017/0353111 A1 * 12/2017 Elasser ............. H02M 3/33571
(Continued)

FOREIGN PATENT DOCUMENTS

CN 109245593 A 1/2019
CN 110401350 A 11/2019
(Continued)

OTHER PUBLICATIONS

ISR for International Application PCT/CN2022/135959 mailed Feb. 11, 2023.
(Continued)

*Primary Examiner* — Rafael O De Leon Domenech
(74) *Attorney, Agent, or Firm* — Ladas & Parry LLP

(57) ABSTRACT

A control method for a resonant dual active bridge conversion circuit, including the following steps: sampling a voltage on a direct current side of a primary circuit, a voltage on a direct current side of a secondary circuit, and a secondary current; calculating a voltage gain based on an input voltage and an output voltage; calculating, based on the voltage gain, an intra-bridge phase shift angle $\Phi_1$ and a phase angle difference $\Phi_2$, the intra-bridge phase shift angle $\Phi_1$ and the phase angle difference $\Phi_2$ being values at a resonant frequency; calculating a switching frequency of the resonant dual active bridge conversion circuit based on the secondary current; and generating control signals based on the switching frequency, the intra-bridge phase shift angle $\Phi_1$ and the (Continued)

phase angle difference $\Phi_2$ at the resonant frequency, to control the switches in the primary circuit and the secondary circuit.

15 Claims, 6 Drawing Sheets

(56)                    References Cited

U.S. PATENT DOCUMENTS

| | | |
|---|---|---|
| 2021/0211066 A1 | 7/2021 | Vavilpalli et al. |
| 2022/0140739 A1 * | 5/2022 | Liu ................... H02M 3/33576 |
| | | 363/13 |
| 2022/0294357 A1 * | 9/2022 | Channegowda .. H02M 3/33592 |
| 2022/0345045 A1 * | 10/2022 | Drofenik ........... H02M 3/33571 |

FOREIGN PATENT DOCUMENTS

| | | |
|---|---|---|
| CN | 111987918 A | 11/2020 |
| CN | 113364298 A | 9/2021 |
| CN | 113872451 A | 12/2021 |

OTHER PUBLICATIONS

Written Opinion for International Application PCT/CN2022/135959 mailed Feb. 11, 2023.

* cited by examiner

CONTROL METHOD FOR RESONANT DUAL ACTIVE BRIDGE CONVERSION CIRCUIT, CONTROLLER, AND CONVERTER

CROSS-REFERENCE TO RELATED APPLICATIONS

This application is an application under 35 U.S.C. 371 of International Application No. PCT/CN2022/135959 filed on 1 Dec. 2022. This application claims priority to the Chinese Patent Application No. CN202111457868.0 filed on Dec. 2, 2021 and entitled "CONTROL METHOD FOR RESONANT DUAL ACTIVE BRIDGE CONVERSION CIRCUIT, CONTROLLER, AND CONVERTER", which is are incorporated herein by reference in its entirety.

TECHNICAL FIELD

The present invention relates to the field of power electronic technologies, and in particular, to a control method for a resonant dual active bridge conversion circuit, a controller, and a converter.

BACKGROUND

In recent years, due to the development of electric vehicle charging, photovoltaic energy storage and other industries, a DC/DC converter attracts more attention. In particular, a dual active bridge DC/DC converter can achieve electrical isolation between a primary side and a secondary side by using a transformer, which is a popular research topic in the DC/DC converter.

However, a DAB (Dual Active Bridge, dual active bridge) conversion circuit has some defects currently, such as a narrow range of a voltage gain and a soft switching failure of a switching device under certain working conditions.

An existing improved solution is to add an LC resonant circuit to the DAB conversion circuit to solve the above problems, and using frequency control or phase shift control to control the DAB conversion circuit with a resonant network, or dividing working intervals of the DAB conversion circuit based on its input and output voltage and power, and in each interval selects phase shift control or frequency control optimally. The DAB conversion circuit using the foregoing control can achieve a wider working range and/or higher efficiency, but the amount of calculation is large and control is complex.

SUMMARY

According to various embodiments of this application, a control method for a resonant dual active bridge conversion circuit, a controller, and a converter are provided to solve the problem of a large amount of calculation and complex control in the conventional technologies that using variable frequency phase shifting control to control the resonant dual active bridge conversion circuit.

According to a first aspect, embodiments of this application provide a control method for a resonant dual active bridge conversion circuit. The resonant dual active bridge conversion circuit includes a primary circuit, at least one secondary circuit, a resonant tank, and a transformer. An alternating current side of the primary circuit is electrically connected to a primary side of the transformer through the resonant tank. The resonant tank includes a resonant capacitor and a resonant inductor connected in series, and an alternating current side of the secondary circuit is electrically connected to a secondary side of the transformer. The method includes the following steps:

sampling a voltage on a direct current side of the primary circuit, a voltage on a direct current side of the secondary circuit, and a secondary current;

calculating a voltage gain based on the voltage on the direct current side of the primary circuit and the voltage on the direct current side of the secondary circuit;

calculating, based on the voltage gain, an intra-bridge phase shift angle $\Phi_1$ of the primary circuit and a phase angle difference $\Phi_2$ between an inter-bridge phase shift angle $\Phi_{ps}$ and an intra-bridge phase shift angle $\Phi_p$, the intra-bridge phase shift angle $\Phi_1$ and the phase angle difference $\Phi_2$ being values at a resonant frequency, and the inter-bridge phase shift angle $\Phi_{ps}$ and the intra-bridge phase shift angle $\Phi_p$ being values at a switching frequency;

calculating the switching frequency of the resonant dual active bridge conversion circuit based on the secondary current; and generating control signals based on the switching frequency, the intra-bridge phase shift angle $\Phi_1$ and the phase angle difference $\Phi_2$ at the resonant frequency, to control switchings of switches in the primary circuit and the secondary circuit.

Further, a step of calculating, based on the voltage gain, an intra-bridge phase shift angle $\Phi_1$ of the primary circuit and a phase angle difference $\Phi_2$ between an inter-bridge phase shift angle $\Phi_{ps}$ and an intra-bridge phase shift angle $\Phi_p$ includes:

obtaining expressions of a resonant inductor current and a resonant capacitor voltage in time domain;

unitizing, by using a positive value of a midpoint voltage of a primary side bridge arm as a reference value, voltages and currents in the expressions of the resonant inductor current and the resonant capacitor voltage to obtain a relational expression of the resonant inductor current and the resonant capacitor voltage;

obtaining a relational expression among the resonant inductor current, the resonant capacitor voltage, and the voltage gain at different moments based on the relational expression of the resonant inductor current and the resonant capacitor voltage, and a real-time midpoint voltage of the primary side bridge arms and a real-time midpoint voltage of a secondary side bridge arms in each sinusoidal half-wave cycle; and geometrizing the relational expression of the resonant inductor current and the resonant capacitor voltage, and the relational expression among the resonant inductor current, the resonant capacitor voltage, and the voltage gain, to obtain the intra-bridge phase shift angle $\Phi_1$ and the phase angle difference $\Phi_2$ at the resonant frequency based on a geometric relationship.

Further, when the voltage gain is less than 1, the intra-bridge phase shift angle $\Phi_1$ and the phase angle difference $\Phi_2$ at the resonant frequency are:

$$\begin{cases} \Phi_2 = \sin^{-1} \dfrac{H_3}{1+M+M_C} \\ \Phi_1 = \cos^{-1}(2M-1) \end{cases}$$

where a value of $H_3$ is determined by a dead time and is a known quantity, M is the voltage gain, and $M_c$ is a per-unit value of a voltage peak value of the resonant capacitor with a positive value of a midpoint voltage of primary side bridge arms as a reference value.

Further, when the voltage gain is greater than or equal to 1, the intra-bridge phase shift angle $\Phi_1$ and the phase angle difference $\Phi_2$ at the resonant frequency are:

$$
\begin{cases}
\Phi_2 = \sin^{-1} \dfrac{H_3}{1 + M + M_C} \\[2mm]
\Phi_1 = \cos^{-1}\left(\dfrac{2}{M} - 1\right)
\end{cases}
$$

where a value of $H_3$ is determined by a dead time and is a known quantity, M is the voltage gain, and $M_c$ is a per-unit value of a voltage peak value of the resonant capacitor with a positive value of a midpoint voltage of primary side bridge arms as a reference value.

Further, a step of generating control signals based on the switching frequency, the intra-bridge phase shift angle and the phase angle difference at the resonant frequency includes:

calculating the intra-bridge phase shift angle $\Phi_p$ and the inter-bridge phase shift angle $\Phi_{ps}$ at the switching frequency based on the switching frequency, and the intra-bridge phase shift angle $\Phi_1$ and the phase angle difference $\Phi_2$ at the resonant frequency, wherein the intra-bridge phase shift angle $\Phi_p$ and the inter-bridge phase shift angle $\Phi_{ps}$ at the switching frequency are respectively:

$$
\Phi_p = \frac{f_s}{f_r}\Phi_1, \; \Phi_{ps} = \frac{f_s}{f_r}(\Phi_1 + \Phi_2)
$$

where $f_r$ is the resonant frequency of the resonant tank and $f_s$ is the switching frequency of the switches.

Further, a step of calculating the switching frequency of the resonant dual active bridge conversion circuit based on the secondary current includes:

comparing the secondary current with a reference current to obtain an amplified difference between the secondary current and the reference current, and calculating the switching frequency based on the amplified difference.

Further, the primary circuit includes a first bridge arm and a second bridge arm, an intra-bridge phase shift angle is between on signals of an upper switch in the first bridge arm and a lower switch in the second bridge arm, and the intra-bridge phase shift angle is between on signals of a lower switch in the first bridge arm and an upper switch in the second bridge arm.

Further, the secondary circuit includes a third bridge arm and a fourth bridge arm, an upper switch in the third bridge arm and a lower switch in the fourth bridge arm are turned on or off simultaneously, a lower switch in the third bridge arm and an upper switch in the fourth bridge arm are turned on or off simultaneously, and an inter-bridge phase shift angle is between on signals of the upper switch of the first bridge arm and the upper switch of the third bridge arm.

According to a second aspect, embodiments of this application further provide a controller, configured to control a resonant dual active bridge conversion circuit. The resonant dual active bridge conversion circuit includes a primary circuit, at least one secondary circuit, a resonant tank, and a transformer. An alternating current side of the primary circuit is electrically connected to a primary side of the transformer through the resonant tank. The resonant tank includes a resonant capacitor and a resonant inductor in series, and an alternating current side of the secondary circuit is electrically connected to a secondary side of the transformer. The controller includes:

a sampling unit, configured to sample a voltage on a direct current side of the primary circuit, a voltage on a direct current side of the secondary circuit, and a secondary current;

a voltage gain calculating unit, configured to calculate a voltage gain based on the voltage on the direct current side of the primary circuit and the voltage on the direct current side of the secondary circuit;

a phase shift angle calculating unit, configured to calculate, based on the voltage gain, an intra-bridge phase shift angle $\Phi_1$ of the primary circuit and a phase angle difference $\Phi_2$ between an inter-bridge phase shift angle $\Phi_{ps}$ and an intra-bridge phase shift angle $\Phi_p$, the intra-bridge phase shift angle $\Phi_1$ and the phase angle difference $\Phi_2$ being values at a resonant frequency, and the inter-bridge phase shift angle $\Phi_{ps}$ and the intra-bridge phase shift angle $\Phi_p$ being values at a switching frequency;

a switching frequency calculating unit, configured to calculate the switching frequency of the resonant dual active bridge conversion circuit based on the secondary current; and a PWM generating unit, configured to generate control signals based on the switching frequency, the intra-bridge phase shift angle $\Phi_1$ and the phase angle difference $\Phi_2$ at the resonant frequency, wherein the control signals are used for controlling switchings of switches in the primary circuit and the secondary circuit.

According to a third aspect, embodiments of this application further provide a converter. The converter includes:

a resonant dual active bridge conversion circuit, wherein the resonant dual active bridge conversion circuit includes a primary circuit, at least one secondary circuit, a resonant tank, and a transformer including at least one winding on primary and secondary sides respectively, an alternating current side of the primary circuit is electrically connected to a primary winding of the transformer through the resonant tank, wherein the resonant tank includes a resonant capacitor and a resonant inductor connected in series, one secondary circuit corresponds to one secondary winding of the transformer, and each alternating current side of the secondary circuit is electrically connected to a corresponding secondary winding; and a controller, wherein the controller performs the control method for the resonant dual active bridge conversion circuit provided in this application.

Compared with the prior arts, the resonant dual active bridge conversion circuit in the present invention uses a control method that combines phase shift control and frequency control, and uses a time domain analysis method to obtain the relational expression of a resonant capacitor voltage and a resonant inductor current, and geometrizes the relationship between the resonant capacitor voltage and the resonant inductor current. According to the geometric figure, a value of an intra-bridge phase shift angle at a resonant frequency and a value of a phase angle difference at the resonant frequency between an inter-bridge phase shift angle and an intra-bridge phase shift angle that are only related to the voltage gain are obtained. According to the values of the intra-bridge phase shift angle and the phase angle difference both at the resonant frequency, values of the intra-bridge phase shift angle and an inter-bridge phase shift angle both at a switching frequency is calculated. According to the calculated values of the intra-bridge phase shift angle and the inter-bridge phase shift angle and the calculated switching frequency, the conversion circuit is controlled to enable each switch in the circuit to achieve ZVS, improving work efficiency, and having a wide range of the voltage gain and high degree of control freedom. The control of the present invention is simple and the amount of calculation is small, it is highly efficient and practical.

Further, a converter including a plurality of secondary circuits and direct current sides of the secondary circuits are connected in parallel is provided, to avoid a problem of excessive current stress of a switching device of the low-voltage side (secondary side) in high power applications.

The details of one or more embodiments of this application are proposed in the following drawings and descriptions to make other features, objects, and advantages of this application more concise and understandable.

BRIEF DESCRIPTION OF THE DRAWINGS

To better describe and illustrate embodiments and/or examples of the application disclosed herein, reference may be made to one or more of the accompanying drawings. The additional details or examples used for describing the accompanying drawings should not be construed as limiting the scope of any of the disclosed applications, the embodiments and/or examples presently described, and the best mode currently understood of these applications.

DETAILED DESCRIPTION

The present invention will be described in detail below with reference to the specific implementations shown in the accompanying drawings. However, these implementations do not limit the present invention. Any structural, method, or functional changes made by a person of ordinary skill in the art based on these implementations are included in the protection scope of the present invention.

Figure 1:
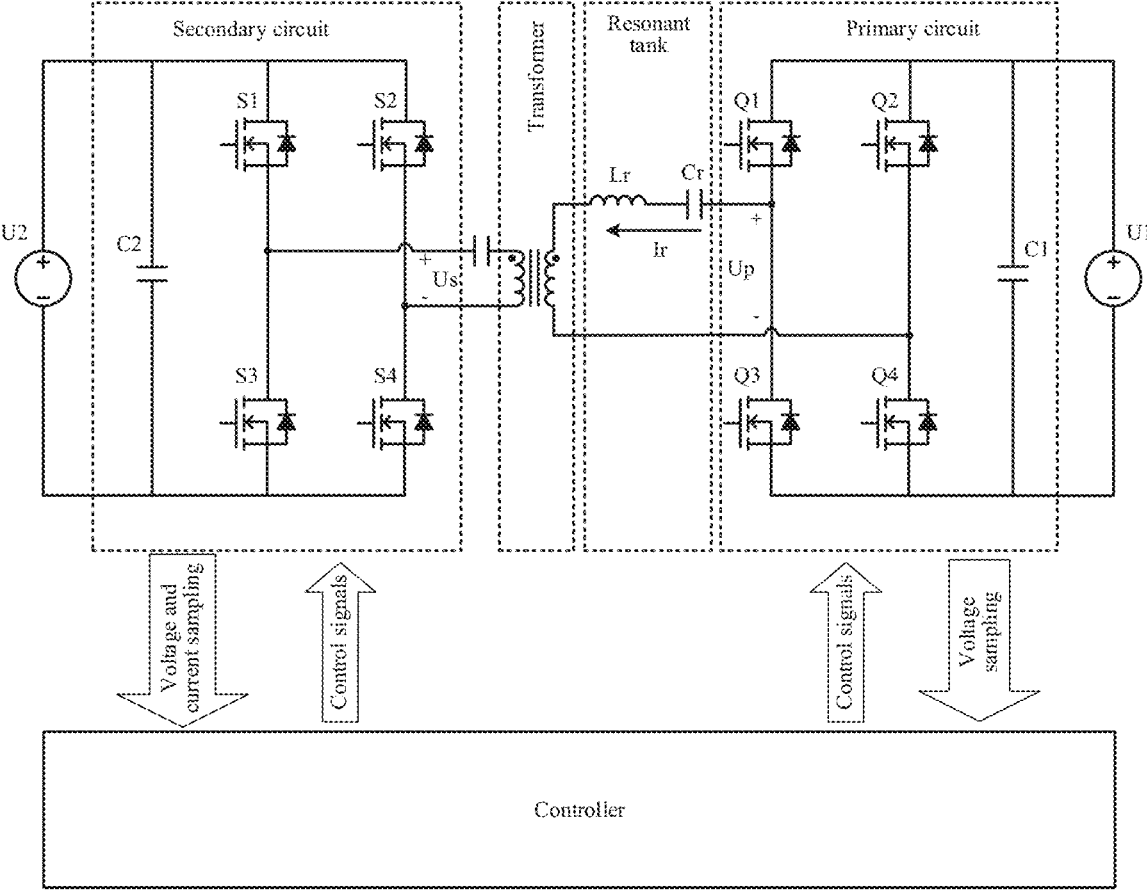
FIG. 1 is a schematic diagram of a converter according to the present application.

FIG. 1 is a schematic diagram of a converter according to the present application. The converter includes a resonant dual active bridge conversion circuit and a controller. The resonant dual active bridge conversion circuit includes a primary circuit, a secondary circuit, a transformer, and a resonant tank. The resonant dual active bridge conversion circuit is controlled by the controller.

A direct current side of the primary circuit is electrically connected to an input/output source $U_1$, and an alternating current side of the primary circuit is electrically connected to a primary winding of the transformer via the resonant tank. An alternating current side of the secondary circuit is electrically connected to a secondary winding of the transformer, and a direct current side of the secondary circuit is electrically connected to an input/output source $U_2$.

As shown in FIG. 1, the primary circuit includes a first full bridge and a stabilizing capacitor $C_1$. The first full bridge includes a first bridge arm and a second bridge arm. The first bridge arm includes a second switch $Q_2$ and a fourth switch $Q_4$. A connection point of the second switch $Q_2$ and the fourth switch $Q_4$ is used as a midpoint of the first bridge arm, and the midpoint of the first bridge arm is used as a first terminal of the alternating current side of the primary circuit. The second switch $Q_2$ is used as an upper switch of the first bridge arm, and the fourth switch $Q_4$ is used as a lower switch of the first bridge arm. The second bridge arm includes a first switch $Q_1$ and a third switch $Q_3$. A connection point of the first switch $Q_1$ and the third switch $Q_3$ is used as a midpoint of the second bridge arm, and the midpoint of the second bridge arm is used as a second terminal of the alternating current side of the primary circuit. The first switch $Q_1$ is used as an upper switch of the second bridge arm, and the third switch $Q_3$ is used as a lower switch of the second bridge arm. A midpoint voltage Up of primary side bridge arms is provided between the midpoint of the second bridge arm and the midpoint of the first bridge arm.

The first switch $Q_1$ to the fourth switch $Q_4$ may be MOS transistors or IGBTs. Specifically, in this application, a MOS transistor is used as an example. In this case, a drain of the first switch $Q_1$ and a drain of the second switch $Q_2$ are connected and used as a positive terminal of the direct current side of the primary circuit, and are electrically connected to a positive electrode of the input/output source $U_1$. A source of the first switch $Q_1$ is connected to a drain of the third switch $Q_3$, and a connection point is the midpoint of the second bridge arm. A source of the second switch $Q_2$ is connected to a drain of the fourth switch $Q_4$, and a connection point is the midpoint of the first bridge arm. A source of the third switch $Q_3$ and a source of the fourth switch $Q_4$ are connected and used as a negative terminal of the direct current side of the primary circuit, and are electrically connected to a negative electrode of the input/output source $U_1$. Gates of the first switch $Q_1$ to the fourth switch $Q_4$ are separately connected to the controller, and switching based on control signals provided by the controller.

The stabilizing capacitor $C_1$ is connected in parallel with the first bridge arm to stabilize a voltage on the direct current side of the primary circuit. The resonant tank includes a resonant capacitor Cr and a resonant inductor Lr connected in series. One terminal of the resonant capacitor Cr is connected to the midpoint of the second bridge arm, the other terminal of the resonant capacitor Cr is connected to one terminal of the resonant inductor Lr, the other terminal of the resonant inductor Lr is electrically connected to one terminal of the primary winding of the transformer, and the other terminal of the primary winding of the transformer is electrically connected to the midpoint of the first bridge arm.

As shown in FIG. 1, the secondary circuit includes a second full bridge and a stabilizing capacitor $C_2$. The second full bridge includes a third bridge arm and a fourth bridge arm connected in parallel. The third bridge arm includes a fifth switch $S_1$ and a sixth switch $S_3$, and the fourth bridge arm includes a seventh switch $S_2$ and an eighth switch $S_4$ connected in series. A connection point of the fifth switch $S_1$ and the sixth switch $S_3$ is used as a midpoint of the third bridge arm, and a connection point of the seventh switch $S_2$ and the eighth switch $S_4$ is used as a midpoint of the fourth bridge arm. The midpoint of the third bridge arm is used as a first terminal of an alternating current side of the secondary circuit, and the midpoint of the fourth bridge arm is used as a second terminal of the alternating current side of the secondary circuit. The fifth switch $S_1$ is used as an upper switch of the third bridge arm, the sixth switch $S_3$ is used as a lower switch of the third bridge arm. The seventh switch $S_2$ is used as an upper switch of the fourth bridge arm, and the eighth switch $S_4$ is used as a lower switch of the fourth bridge arm. A midpoint voltage Us of secondary side bridge arms is provided between the midpoint of the third bridge arm and the midpoint of the fourth bridge arm.

The fifth switch $S_1$ to the eighth switch $S_4$ are MOS transistors or IGBTs. In this application, a MOS transistor is used as an example. A drain of the fifth switch $S_1$ and a drain of the seventh switch $S_2$ are connected and used as a positive terminal of the direct current side of the secondary circuit, and are electrically connected to a positive electrode of the input/output source $U_2$. A source of the fifth switch $S_1$ is connected to a drain of the sixth switch $S_3$, and a connection point is the midpoint of the third bridge arm. A source of the sixth switch $S_3$ and a source of the eighth switch $S_4$ are connected and used as a negative terminal of the direct current side of the secondary circuit, and are electrically connected to a negative electrode of the input/output source $U_2$.

Gates of the fifth switch $S_1$ to the eighth switch $S_4$ are separately connected to the controller, and switching based on control signals provided by the controller.

The stabilizing capacitor $C_2$ is connected in parallel with the third bridge arm to stabilize a voltage on the direct current side of the secondary circuit. In the secondary circuit, the first terminal of the alternating current side of the secondary circuit is electrically connected to one terminal of the secondary winding of the transformer, and the second terminal of the alternating current side of the secondary circuit is electrically connected to the other terminal of the secondary winding of the transformer. As an optional implementation, a capacitor may be connected in series between the alternating current side of the secondary circuit and the secondary winding of the transformer.

The controller uses phase shifting and switching frequency control to control the first switch $Q_1$ to the fourth switch $Q_4$ and the fifth switch $S_1$ to the eighth switch $S_4$ based on the voltage on the direct current side of the primary circuit, the voltage on the direct current side of the secondary circuit, and a secondary current, and generates control signals that control the switching of the first switch $Q_1$ to the fourth switch $Q_4$ and the fifth switch $S_1$ to the eighth switch $S_4$.

Specifically, the controller samples the voltage on the direct current side of the primary circuit and the voltage on the direct current side of the secondary circuit, calculates a voltage gain based on the voltage on the direct current side of the primary circuit and the voltage on the direct current side of the secondary circuit, and calculates, based on the voltage gain, an intra-bridge phase shift angle $\Phi_1$ of the primary circuit and a phase angle difference $\Phi_2$ between an inter-bridge phase shift angle $\Phi_{ps}$ and an intra-bridge phase shift angle $\Phi_p$, the intra-bridge phase shift angle $\Phi_1$ and the phase angle difference $\Phi_2$ are values at a resonant frequency, and the inter-bridge phase shift angle $\Phi_{ps}$ and the intra-bridge phase shift angle $\Phi_p$ are values at a switching frequency, the phase angle difference $\Phi_2$ is a value of the phase angle difference between an inter-bridge phase shift angle $\Phi_{ps}$ and an intra-bridge phase shift angle $\Phi_p$ converted from the switching frequency to the resonant frequency; samples the secondary current of the secondary circuit and calculates the switching frequency based on the secondary current, calculates the inter-bridge phase shift angle $\Phi_{ps}$ and the intra-bridge phase shift angle $\Phi_p$ based on the switching frequency, the intra-bridge phase shift angle $\Phi_1$, and the phase angle difference $\Phi_2$; and generates control signals based on the intra-bridge phase shift angle $\Phi_p$, the inter-bridge phase shift angle $\Phi_{ps}$, and the switching frequency to control the first switch $Q_1$ to the fourth switch $Q_4$ and the fifth switch $S_1$ to the eighth switch $S_4$.

For the resonant dual active bridge conversion circuit, as an optional implementation, the first switch $Q_1$ and the third switch $Q_3$ of the first full bridge are complementary to each other, and the second switch $Q_2$ and the fourth switch $Q_4$ are complementary to each other. A dead time is set between switches complementary to each other to ensure no risk of shoot through between switches of a same bridge arm. There is an intra-bridge phase shift angle $\Phi_p$ between on signals of the first switch $Q_1$ and the fourth switch $Q_4$, and the intra-bridge phase shift angle $\Phi_p$ is also between on signals of the second switch $Q_2$ and the third switch $Q_3$.

As an optional implementation, in the second full bridge, the fifth switch $S_1$ and the seventh switch $S_3$ are complementary to each other, and the sixth switch $S_2$ and the eighth switch $S_4$ are complementary to each other. In addition, the fifth switch $S_1$ and the eighth switch $S_4$ switch are turned on or off simultaneously, and the sixth switch $S_2$ and the seventh switch $S_3$ are turned on or off simultaneously. A dead time is set between switches that are complementary to each other.

Because there are the intra-bridge phase shift angle $\Phi_p$ between on signals of the first switch $Q_1$ and the fourth switch $Q_4$ of the first bridge arm and the inter-bridge phase shift angle $\Phi_{ps}$ between on signals of the first switch $Q_1$ of the first full bridge and the fifth switch $S_1$ of the second full bridge, therefore a phase angel difference $\Phi_{ps}$-$\Phi_p$ is between the phases of the midpoint voltage Up of the primary side bridge arms and the midpoint voltage Us of the secondary side bridge arms at the switching frequency.

By controlling the inter-bridge phase shift angle $\Phi_{ps}$ and the intra-bridge phase shift angle $\Phi_p$, a power transmission direction can be controlled. Power may be transferred from the primary circuit to the secondary circuit, or may be transferred from the secondary circuit to the primary circuit.

Figure 2:
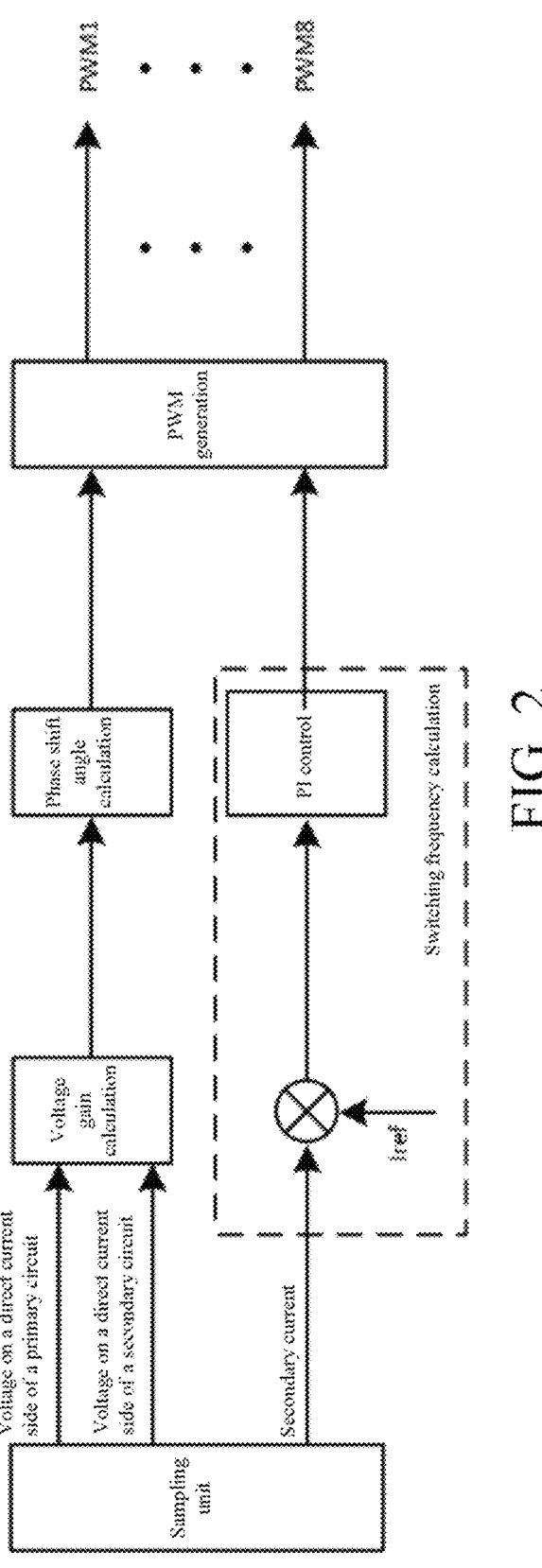
FIG. 2 is a schematic diagram of a controller according to the present application.

FIG. 2 shows a schematic block diagram of a controller according to an embodiment of the present invention. As shown in FIG. 2, the controller includes:

a sampling unit, configured to sample a voltage on a direct current side of the primary circuit, a voltage on a direct current side of the secondary circuit, and a secondary current, a voltage gain calculating unit, configured to calculate a voltage gain based on the voltage on the direct current side of the primary circuit and the voltage on the direct current side of the secondary circuit;

a phase shift angle calculating unit, configured to calculate, based on the voltage gain, an intra-bridge phase shift angle $\Phi_1$ of the primary circuit and a phase angle difference $\Phi_2$ between an inter-bridge phase shift angle $\Phi_{ps}$ and an intra-bridge phase shift angle $\Phi_p$, the intra-bridge phase shift angle $\Phi_1$ and the phase angle difference $\Phi_2$ are values at a resonant frequency, and the inter-bridge phase shift angle $\Phi_{ps}$ and the intra-bridge phase shift angle $\Phi_p$ are values at a switching frequency;

a switching frequency calculating unit, configured to calculate the switching frequency of the resonant dual active bridge conversion circuit based on the secondary current; and a PWM generating unit, configured to generate control signals PWM1 to PWM8 based on the switching frequency, the intra-bridge phase shift angle $\Phi_1$ and the phase angle difference $\Phi_2$, to control the switches in the primary circuit and the secondary circuit respectively.

Specifically, the switching frequency calculating unit includes an error amplification module and a PI control module. The error amplification module compares the secondary current with the reference current $I_{ref}$ to obtain an amplified difference between the secondary current and the reference current $I_{ref}$. The PI control module calculates the switching frequency based on the amplified difference.

The PWM generating unit obtains, based on the intra-bridge phase shift angle $\Phi_1$ and the phase angle difference $\Phi_2$ at the resonant frequency, and the switching frequency, the intra-bridge phase shift angle $\Phi_p$ at the switching frequency and the inter-bridge phase shift angle $\Phi_{ps}$ at the switching frequency, and generates the control signals PWM1 to PWM8 based on the switching frequency and the intra-bridge phase shift angle $\Phi_p$ and the inter-bridge phase shift angle $\Phi_{ps}$. The control signals PWM1 to PWM4 are respectively used for controlling the first switch $Q_1$ to the fourth switch $Q_4$. The control signals PWM5 to PWM8 are respectively used for controlling the fifth switch $S_1$ to the eighth switch $S_4$.

A principle of calculating the intra-bridge phase shift angle $\Phi_p$ and the inter-bridge phase shift angle $\Phi_{ps}$ is explained below:

Specifically, expressions of a resonant inductor current and a resonant capacitor voltage in time domain are obtained.

Figure 3:
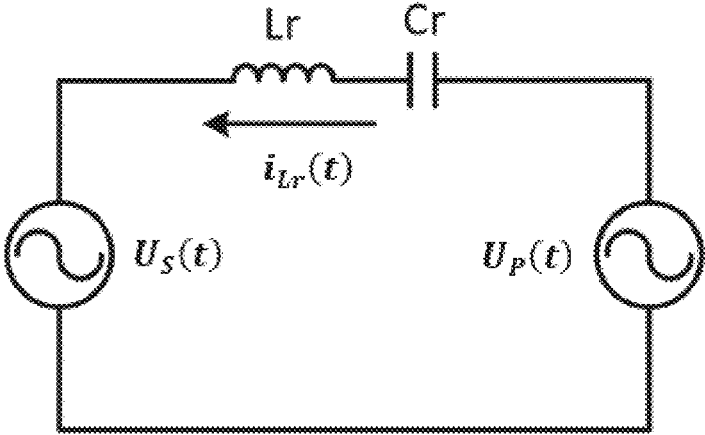
FIG. 3 is a schematic diagram of an equivalent circuit of a resonant dual active bridge conversion circuit according to the present application.

FIG. 3 shows an equivalent circuit of a resonant dual active bridge conversion circuit according to the present application. Expressions of a resonant capacitor voltage $u_{Cr}(t)$ and a resonant inductor current $i_{Lr}(t)$ in the equivalent circuit are as follows:

$$
\begin{cases}
u_{Cr}(t) = [U_P(t) - U_S(t)] + \{U_{Cr}(0) - [U_P(t) - U_S(t)]\} * \\
\qquad \cos(\omega_r * t) + I_{Lr}(0) * Z_r * \sin(\omega_r * t) \\
i_{Lr}(t) = I_{Lr}(0) * \cos(\omega_r * t) - \dfrac{\{U_{Cr}(0) - [U_P(t) - U_S(t)]\}}{Z_r} * \sin(\omega_r * t)
\end{cases}
$$

where, $U_p(t)$ is a real-time midpoint voltage of the primary side bridge arms, and $U_S(t)$ is a voltage converted from a real-time midpoint voltage of the secondary side bridge arms to the primary side. $U_{Cr}(0)$ is an initial voltage of the resonant capacitor Cr, $\omega_r$ is $2\pi f_r$, $f_r$ is the resonant frequency of the resonant tank, $I_{Lr}(0)$ is an initial current of the resonant inductor Lr, $Z_r$ is a base impedance, $$Z_r = \sqrt{\dfrac{L_r}{C_r}}.$$

Further, unitizing voltages and currents in the expressions of the resonant inductor current $i_{Lr}(t)$ and the resonant capacitor voltage $u_{Cr}(t)$, to obtain an expression between the resonant inductor current $i_{Lr}(t)$ and the resonant capacitor voltage $u_{Cr}(t)$.

Specifically, in this application, unitization is performed by using a positive value of the midpoint voltage $U_p$ of the primary side bridge arms as a reference value. If the midpoint voltage $U_p$ of the primary side bridge arms is used as the reference value, unitizing the foregoing quantities.

$$
U_{CN} = \frac{U_{Cr}(0)}{U_P}, \; u_{CN}(t) = \frac{u_{Cr}(t)}{U_P}, \; I_{Ln} = \frac{I_{Lr}(0) * Z_r}{U_P},
$$

$$
i_{Ln}(t) = \frac{i_{Lr}(t) * Z_r}{U_P}, \; U_{SN}(t) = \frac{U_S(t)}{U_P}, \; U_{PN}(t) = \frac{U_P(t)}{U_P}
$$

where, $U_{CN}$ is a per-unit value of the initial voltage of the resonant capacitor Cr, $u_{CN}(t)$ is a per-unit value of the real-time voltage of the resonant capacitor Cr, $I_{LN}$ is a per-unit value of the initial current of the resonant inductor Lr, $i_{LN}(t)$ is a per-unit value of the real-time current of the resonant inductor Lr, $U_{SN}(t)$ is a per-unit value of the voltage $U_S(t)$ converted from a real-time midpoint voltage of the secondary side bridge arms to the primary side, and $U_{PN}(t)$ is a per-unit value of the real-time midpoint voltage $U_p(t)$ of the primary side bridge arms.

Specifically, let $X = U_{PN}(t) - U_{SN}(t)$, so that the following expressions can be obtained:

$$
\begin{cases}
u_{CN}(t) - X = (U_{CN} - X) * \cos(\omega_r * t) + I_{LN} * \\
\qquad \sin(\omega_r * t) = R_x * \cos(\varphi - \omega_r * t) \\
i_{LN}(t) = I_{LN} * \cos(\omega_r * t) - (U_{CN} - X) * \sin(\omega_r * t) = R_x * \sin(\varphi - \omega_r * t)
\end{cases}
$$

After arrangement, the following relational expression can be obtained:

$$
[u_{CN}(t) - X]^2 + [i_{LN}(t)]^2 = R_x^2, \text{ wherein}
$$

$$
\begin{cases}
R_x = \sqrt{(I_{LN})^2 + (U_{CN} - X)^2} \\
\varphi = \tan^{-1}\left(\dfrac{I_{LN}}{(C_{CN} - X)}\right)
\end{cases}
$$

It can be learned that $(u_{CN}(t), i_{LN}(t))$ is exactly a point on a circle with $(X, 0)$ as a center and $R_x$ as a radius. The relational expression of the resonant inductor current $i_{LN}(t)$ and the resonant capacitor voltage $u_{CN}(t)$ is the same as the expression for a circle. At different moments, the midpoint voltage $U_p(t)$ of the primary side bridge arms and the value $U_S(t)$ converted from a real-time midpoint voltage of the secondary side bridge arms to the primary side are different. The center and radius of the circle change, the trajectory of the circle will be different.

Further, obtaining a relational expression among the resonant inductor current $i_{LN}(t)$, the resonant capacitor voltage $u_{Cr}(t)$, and the voltage gain M at different moments based on the relational expression of the resonant inductor current $i_{LN}(t)$ and the resonant capacitor voltage $u_{Cr}(t)$, and the midpoint voltage $U_p(t)$ of the primary side bridge arm and the voltage $U_S(t)$ in each sinusoidal half-wave cycle.

Figure 4:
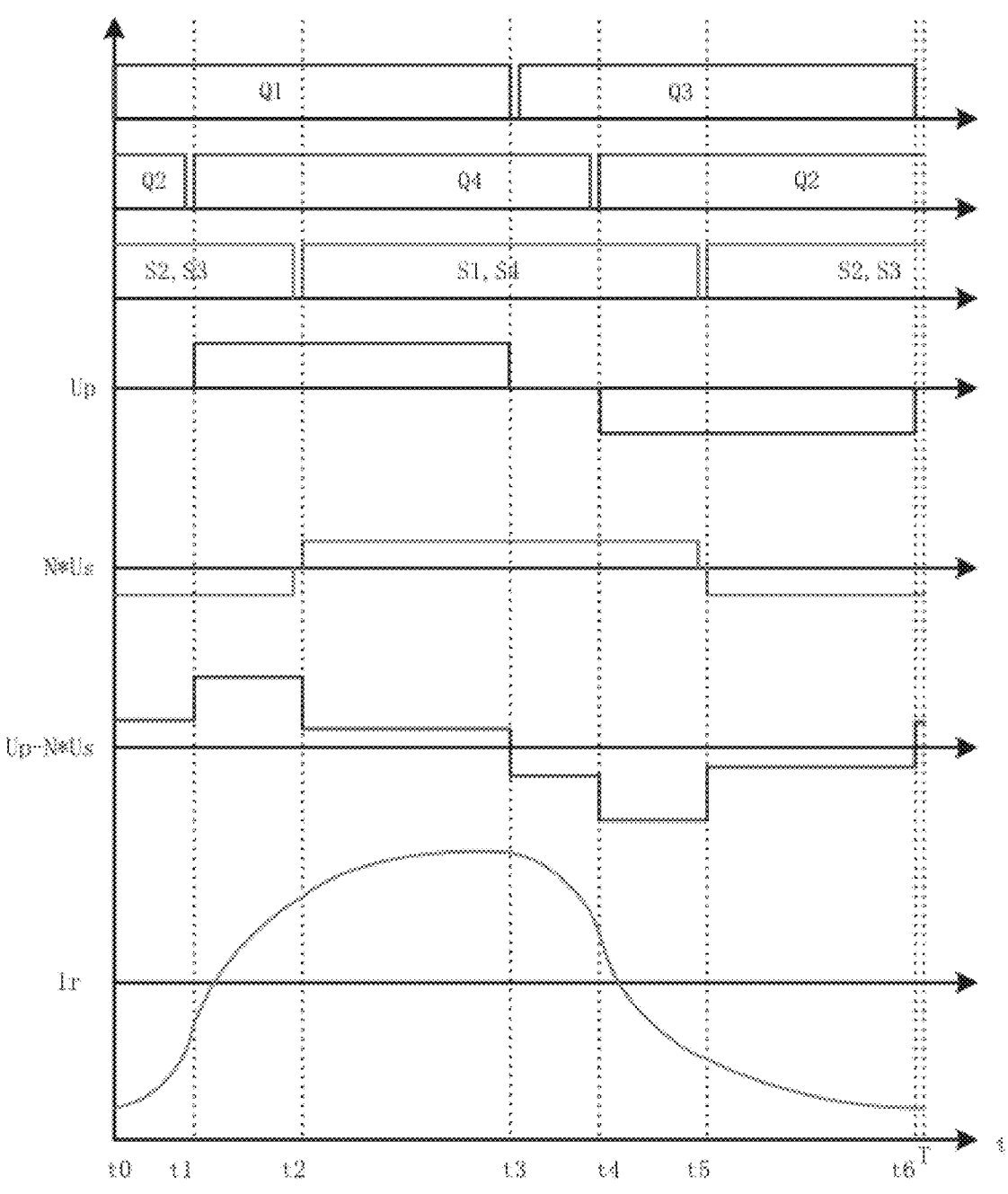
FIG. 4 is a schematic diagram of control signals of switches and voltage and current waveforms of a converter within one cycle when a voltage gain M<1 according to the present application.

FIG. 4 is a schematic diagram of control signals of each switch and voltage and current waveforms of a converter in one sinusoidal cycle when a voltage gain M<1. Up is the midpoint voltage of the primary side bridge arms, N*Us is the voltage converted from a real-time midpoint voltage of the secondary side bridge arms to the primary side, Up–N*Us is a voltage of the resonant inductor Lr, and Ir is the resonant inductor current.

A working process of the conversion circuit in a positive half cycle is explained as follows:

In a first stage [$t_1$, $t_2$], the second switch $Q_2$ is turned off, the fourth switch $Q_4$ is turned on when the resonant inductor current Ir changes from negative value to zero to achieve ZVS. After dead time, the fourth switch $Q_4$ is turned on. In this case, the midpoint voltage Up of the primary side bridge arms is a positive value. The seventh switch $S_2$ and the sixth switch $S_3$ of the secondary circuit keep on, in this case, a voltage across the resonant tank is Up+N*Us, the resonant inductor current Ir increases rapidly and changes from a negative value to a positive value.

In a second stage [$t_2$, $t_3$], the seventh switch $S_2$ and the sixth switch $S_3$ are turned off. Due to the dead time, the fifth switch $S_1$ and the eighth switch $S_4$ are not turned on immediately, and the resonant inductor current Ir flows through anti-parallel diodes of the fifth switch $S_1$ and the eighth switch $S_4$. Once voltages across the fifth switch $S_1$ and the eighth switch $S_4$ are reduced to zero, the fifth switch $S_1$ and the eighth switch $S_4$ are turned on and achieve ZVS. The midpoint voltage Us of the secondary side bridge arms changes from a negative value to a positive value, the first switch $Q_1$ and the fourth switch $Q_4$ keep on, the voltages across the resonant tank is still a positive value, the resonant inductor current Ir is a positive value and increases slowly.

In a third stage [$t_3$, $t_4$], the first switch $Q_1$ is turned off, the third switch $Q_3$ is not turned on immediately due to the dead time, and the resonant inductor current Ir flows through the anti-parallel diode of the third switch $Q_3$. Once a voltage across the third switch $Q_3$ is reduced to zero, the third switch $Q_3$ is turned on and achieves ZVS. In this case, the fourth switch $Q_4$ remains on, the midpoint voltage $U_p$ of the primary side bridge arms is reduced to zero, the fifth switch $S_1$ and the eighth switch $S_4$ keep on, and the midpoint voltage $U_S$ of the secondary side bridge arms is a positive value. The voltage across the resonant tank is a negative value, and the resonant inductor current Ir gradually decreases from a positive value.

Three stages of a negative half cycle [$t_5$, $t_6$], [$t_6$, $t_7$], and [$t_0$, $t_1$] are respectively in one-to-one correspondence with the first stage [$t_1$, $t_2$], the second stage [$t_2$, $t_3$], and the third stage [$t_3$, $t_4$] of the positive half cycle. Details are not described again. A difference between a working mode of the conversion circuit when M>1 and a working mode when M<1 is that a phase shift angle is different in the embodiment of the present invention Specific working process is not described in detail.

Further, based on the foregoing analysis, it can be learned that in a sinusoidal half-wave cycle, the relational expression among the resonant inductor current $i_{LN}(t)$, the resonant capacitor voltage $u_{CN}(t)$ and the voltage gain M is divided into three stages, corresponding to the first stage [$t_1$, $t_2$], the second stage [$t_2$, $t_3$], and the third stage [$t_3$, $t_4$] respectively. It can be learned from FIG. 4 that the first stage [$t_1$, $t_2$] corresponds to a phase angle difference between the inter-bridge phase shift angle $\Phi_{ps}$ and the intra-bridge phase shift angle $\Phi_p$, and the third stage [$t_3$, $t_4$] corresponds to the intra-bridge phase shift angle $\Phi_p$.

Geometrizing the relational expression of the resonant inductor current $i_{LN}(t)$ and the resonant capacitor voltage $u_{CN}(t)$ and the relational expression among the resonant inductor current $i_{LN}(t)$, the resonant capacitor voltage $u_{CN}(t)$, and the voltage gain M, and obtaining the intra-bridge phase shift angle $\Phi_1$ and the phase angle difference $\Phi_2$ at the resonant frequency based on a geometric relationship.

Figure 5:
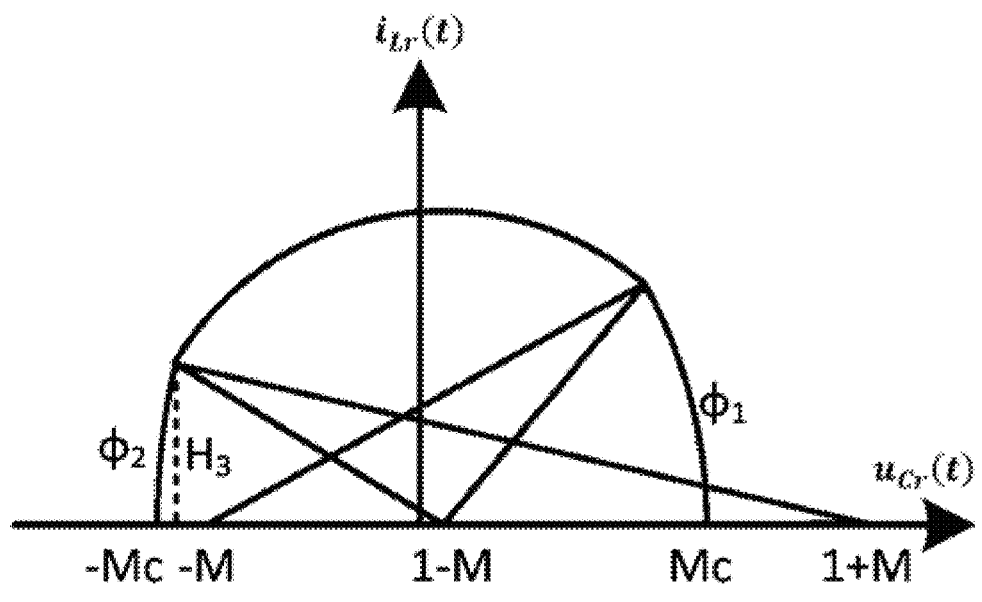
FIG. 5 is a schematic diagram of relations of resonant capacitor voltage $u_{CN}(t)$ and resonant inductor current $i_{LN}(t)$ in different time periods when a voltage gain M<1 according to the present application.

Specifically, geometric figures of the resonant capacitor voltage $u_{CN}(t)$ and resonant inductor current $i_{LN}(t)$ in different time periods are drew in a rectangular coordinate system. FIG. 5 is a schematic diagram of the resonant capacitor voltage $u_{CN}$ (t) and the resonant inductor current $i_{LN}(t)$ in different time periods when the voltage gain M<1. $M_c$ is a per-unit value of a voltage peak value of the resonant capacitor Cr with a positive value $U_p$ of the midpoint voltage of the primary side bridge arms as a reference value. The first stage [$t_1$, $t_2$], the second stage [$t_2$, $t_3$], and the third stage [$t_3$, $t_4$] respectively correspond to three are trajectories. According to the geometric relationship in geometric figures, the intra-bridge phase shift angle $\Phi_1$ and the phase angle difference $\Phi_2$ at the resonant frequency are obtained based on the sine and cosine theorems.

Finally, when M<1, the expressions of the intra-bridge phase shift angle $\Phi_1$ and the phase angle difference $\Phi_2$ are:

$$\begin{cases} \Phi_2 = \sin^{-1}\dfrac{H_3}{1+M+M_C} \\ \Phi_1 = \cos^{-1}(2M-1) \end{cases}$$

where, a value of $H_3$ is determined by the dead time and is a known quantity. It can be learned that the intra-bridge phase shift angle $\Phi_1$ and the phase angle difference $\Phi_2$ are only related to the voltage gain M and not related to the switching frequency. There is only one variable, so the calculation is simple, and the control algorithm is greatly simplified.

As another optional implementation, when the voltage gain M is greater than or equal to 1, the relational expression of $u_{CN}(t)$ and $i_{LN}(t)$, and corresponding figures are different. The following only provides calculation formulas of the intra-bridge phase shift angle $\Phi_1$ and the phase angle difference $\Phi_2$ when M is greater than or equal to 1, and the specific process will not be explained in detail.

$$\begin{cases} \Phi_2 = \sin^{-1}\dfrac{H_3}{1+M+M_C} \\ \Phi_1 = \cos^{-1}\left(\dfrac{2}{M}-1\right) \end{cases}$$

where, the intra-bridge phase shift angle $\Phi_p$ of the primary circuit and the inter-bridge phase shift angle $\Phi_{ps}$ at the switching frequency are calculated based on the intra-bridge phase shift angle $\Phi_1$ and the phase angle difference $\Phi_2$.

Specifically, $$\Phi_p = \frac{f_s}{f_r}\Phi_1, \ \Phi_{ps} = \frac{f_s}{f_r}(\Phi_1 + \Phi_2),$$

where, $f_r$ is the resonant frequency of the resonant tank and $f_s$ is the switching frequency of the switches. The resonant frequency of the resonant tank is determined by the resonant capacitor Cr and the resonant inductor Lr.

Specifically, $$f_r = \frac{1}{2\pi\sqrt{L_r C_r}},$$

$C_r$ is the capacitance of the resonant capacitor, $L_r$ is the inductance of the resonant inductor.

In conclusion, the resonant dual active bridge conversion circuit of the present invention uses a control method that combines phase shift control and frequency control, and uses a time domain analysis method to obtain the relational expression of a resonant capacitor voltage and a resonant inductor current, and geometrizes the relationship between the resonant capacitor voltage and the resonant inductor current. According to the geometric graph, an intra-bridge phase shift angle $\Phi_1$ and a phase angle difference $\Phi_2$ between an inter-bridge phase shift angle $\Phi_{ps}$ and an intra-bridge phase shift angle $\Phi_p$ only related to the voltage gain are obtained. According to the intra-bridge phase shift angle $\Phi_1$ and the phase angle difference $\Phi_2$ at the resonant frequency, an intra-bridge phase shift angle $\Phi_p$, and an inter-bridge phase shift angle $\Phi_{ps}$ at the switching frequency is calculated, and control the conversion circuit based on the calculated intra-bridge phase shift angle $\Phi_p$, the calculated inter-bridge phase shift angle $\Phi_{ps}$ and the calculated switching frequency. This enables each switch in the circuit to achieve ZVS, improving work efficiency, and having a wide range of the voltage gain and high degree of control freedom. So the present invention has simple control, a small amount of calculation, high efficiency and practicality.

As an optional implementation, this application provides a control method for a resonant dual active bridge conversion circuit, including the following steps:

$S_1$: Sampling a voltage on a direct current side of the primary circuit, a voltage on a direct current side of the secondary circuit, and a secondary current, respectively.

$S_2$: Calculating a voltage gain based on the voltage on the direct current side of the primary circuit and the voltage on the direct current side of the secondary circuit.

$S_3$: Calculating, based on the voltage gain, an intra-bridge phase shift angle $\Phi_1$ of the primary circuit and a phase angle difference $\Phi_2$ between an inter-bridge phase shift angle $\Phi_{ps}$ and an intra-bridge phase shift angle $\Phi_p$, the intra-bridge phase shift angle $\Phi_1$ and the phase angle difference $\Phi_2$ being values at a resonant frequency, and the inter-bridge phase shift angle $\Phi_{ps}$ and the intra-bridge phase shift angle $\Phi_p$ being values at a switching frequency.

$S_4$: Calculating the switching frequency of the resonant dual active bridge conversion circuit based on the secondary current.

$S_5$: Generating control signals PWM1 to PWM8 based on the switching frequency, the intra-bridge phase shift angle $\Phi_1$ and the phase angle difference $\Phi_2$ at the resonant frequency, to control the switching of switches in the primary circuit and the secondary circuit, respectively.

Figure 6:
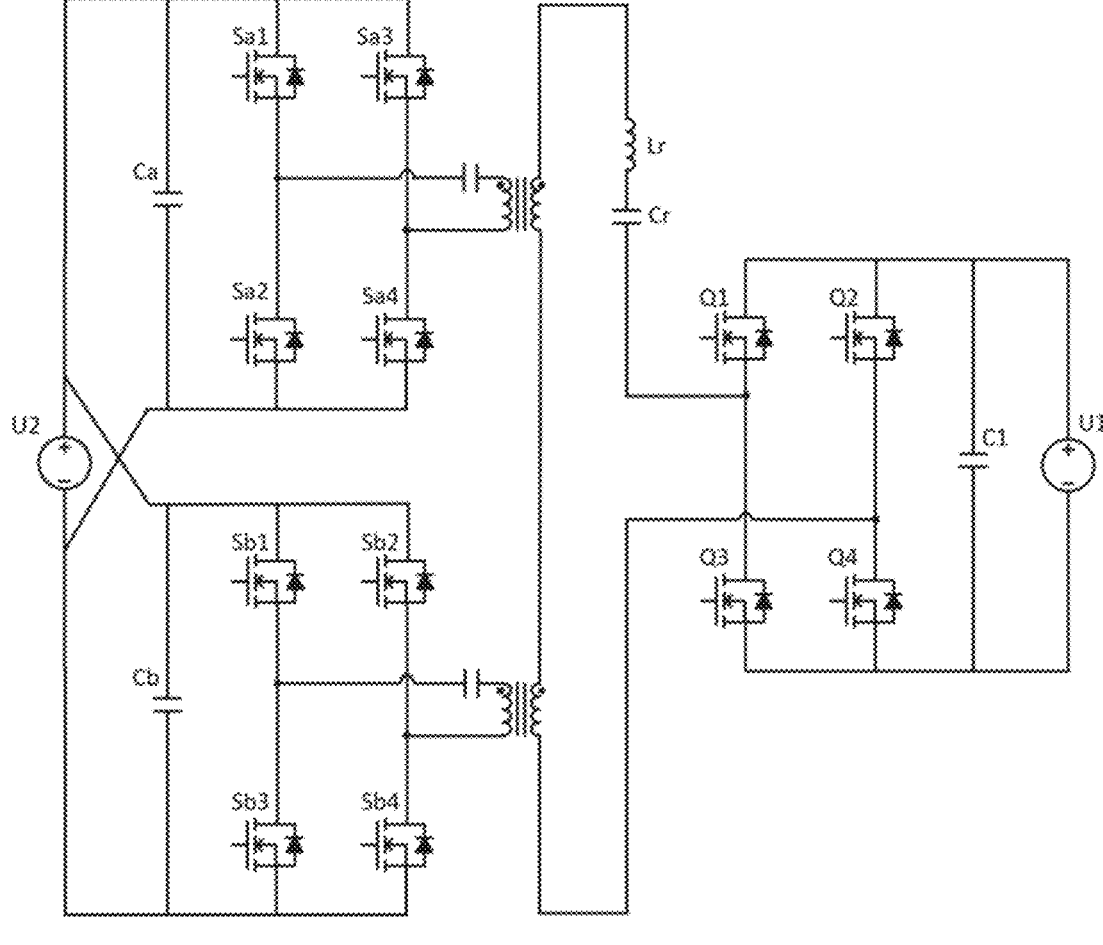
FIG. 6 is a schematic diagram of a resonant dual active bridge conversion circuit having a transformer with two windings on primary and secondary sides respectively.

A multi-winding transformer may be used to avoid current stress of a switching device on a low-voltage side (secondary side) being too large in high power applications, each secondary winding of the transformer is connected in parallel to a low-voltage bus (a bus on the direct current side of the secondary circuit) through a corresponding rectifier bridge. As shown in FIG. 6, as another optional implementation, in a converter provided in the present application, primary and secondary sides of the transformer respectively include two windings. Specifically, a resonant dual active bridge conversion circuit includes a primary circuit, two secondary circuits, a resonant tank, and a transformer including two windings on primary and secondary sides respectively. Each secondary winding of the transformer is connected to a secondary circuit. Direct current sides of the two secondary circuits are connected in parallel, the two primary windings of the transformer are connected in series, and control signals of the two secondary circuits are the same.

Figure 7:
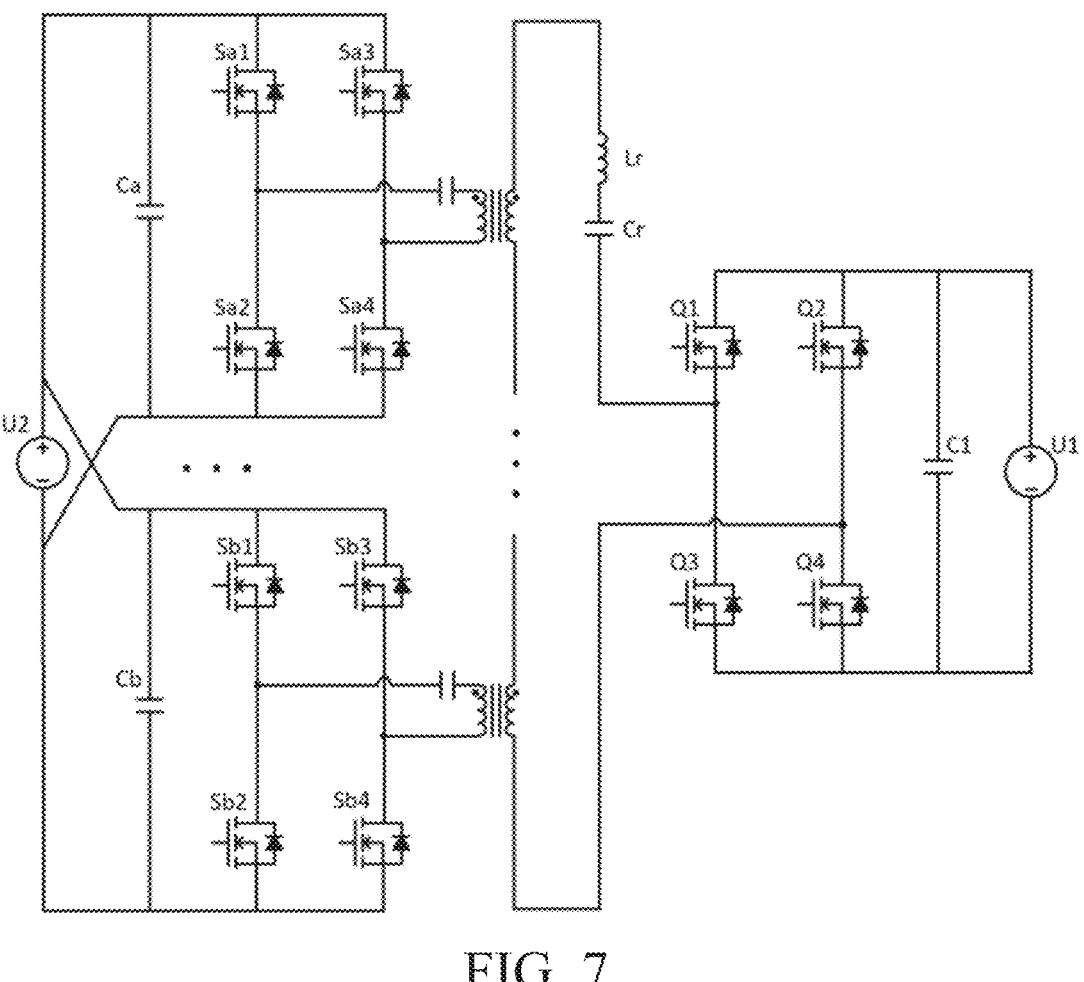
FIG. 7 is a schematic diagram of a resonant dual active bridge conversion circuit having a transformer with a plurality of windings on primary and secondary sides respectively.

As shown in FIG. 7, as another optional implementation, in a converter provided in the present application, primary and secondary sides of the transformer respectively include more than two windings. Specifically, a resonant dual active bridge conversion circuit includes a primary circuit, a plurality of secondary circuits, a resonant tank, and a transformer including a plurality of windings on primary and secondary sides respectively. A quantity of secondary circuits corresponds to a quantity of windings. Each secondary winding of the transformer is connected to a secondary circuit. Direct current sides of the plurality of secondary circuits are connected in parallel, the plurality of primary windings of the transformer are connected in series, and control signals of the plurality of secondary circuits are the same. A working state of the circuit is controlled by a controller provided in this application based on the foregoing control method for a resonant dual active bridge conversion circuit.

The foregoing disclosures are only preferred embodiments of the present invention, but are not intended to limit the scope of claims of the present invention. A person of ordinary skill in the art may understand: without departing from the spirit and scope of the present invention and the appended claims, changes, modifications, substitutions, combinations, and simplifications are all equivalent substitutions and still fall within the scope of the invention.

What is claimed is:

1. A control method for a resonant dual active bridge conversion circuit, wherein the resonant dual active bridge conversion circuit comprises a primary circuit, at least one secondary circuit, a resonant tank, and a transformer, an alternating current side of the primary circuit is electrically connected to a primary side of the transformer through the resonant tank, the resonant tank comprises a resonant capacitor and a resonant inductor connected in series, and an alternating current side of the secondary circuit is electrically connected to a secondary side of the transformer, wherein the method comprises the following steps:

sampling a voltage on a direct current side of the primary circuit, a voltage on a direct current side of the secondary circuit, and a secondary current;

calculating a voltage gain based on the voltage on the direct current side of the primary circuit and the voltage on the direct current side of the secondary circuit;

calculating, based on the voltage gain, an intra-bridge phase shift angle $\Phi_1$ of the primary circuit and a phase angle difference $\Phi_2$ between an inter-bridge phase shift angle $\Phi_{ps}$ and an intra-bridge phase shift angle $\Phi_p$, the intra-bridge phase shift angle $\Phi_1$ and the phase angle difference $\Phi_2$ being values at a resonant frequency, and the inter-bridge phase shift angle $\Phi_{ps}$ and the intra-bridge phase shift angle $\Phi_p$ being values at a switching frequency;

calculating the switching frequency of the resonant dual active bridge conversion circuit based on the secondary current; and generating control signals based on the switching frequency, the intra-bridge phase shift angle $\Phi_1$ and the phase angle difference $\Phi_2$ at the resonant frequency, to control switches in the primary circuit and the secondary circuit.

2. The control method according to claim 1, wherein when the voltage gain is less than 1, the intra-bridge phase shift angle $\Phi_1$ and the phase angle difference $\Phi_2$ at the resonant frequency are:

$$\begin{cases} \Phi_2 = \sin^{-1}\dfrac{H_3}{1+M+M_C} \\ \Phi_1 = \cos^{-1}(2M-1) \end{cases}$$

where a value of $H_3$ is determined by a dead time and is a known quantity, M is the voltage gain, and $M_c$ is a per-unit value of a voltage peak value of the resonant capacitor with a positive value of a midpoint voltage of primary side bridge arms as a reference value.

3. The control method according to claim 1, wherein when the voltage gain is greater than or equal to 1, the intra-bridge phase shift angle $\Phi_1$ and the phase angle difference $\Phi_2$ at the resonant frequency are:

$$\begin{cases} \Phi_2 = \sin^{-1}\dfrac{H_3}{1+M+M_C} \\ \Phi_1 = \cos^{-1}\left(\dfrac{2}{M}-1\right) \end{cases}$$

where a value of $H_3$ is determined by a dead time and is a known quantity, M is the voltage gain, and $M_c$ is a per-unit value of a voltage peak value of the resonant capacitor with a positive value of a midpoint voltage of primary side bridge arms as a reference value.

4. The control method according to claim 1, wherein a step of generating control signals based on the switching frequency, the intra-bridge phase shift angle $\Phi_1$ and the phase angle difference $\Phi_2$ at the resonant frequency comprises:

calculating the intra-bridge phase shift angle op and the inter-bridge phase shift angle $\Phi_{ps}$ at the switching frequency based on the switching frequency, and the intra-bridge phase shift angle $\Phi_1$ and the phase angle difference $\Phi_2$ at the resonant frequency, wherein the intra-bridge phase shift angle $\Phi_p$ and the inter-bridge phase shift angle $\Phi_{ps}$ at the switching frequency are respectively:

$$\Phi_p = \frac{f_s}{f_r}\Phi_1, \ \Phi_{ps} = \frac{f_s}{f_r}(\Phi_1 + \Phi_2)$$

where $f_r$ is the resonant frequency of the resonant tank and $f_s$ is the switching frequency of the switches.

5. The control method according to claim 1, wherein a step of calculating the switching frequency of the resonant dual active bridge conversion circuit based on the secondary current comprises:

comparing the secondary current with a reference current to obtain an amplified difference between the secondary current and the reference current, and calculating the switching frequency based on the amplified difference.

6. The control method according to claim 1, wherein the primary circuit comprises a first bridge arm and a second bridge arm, an intra-bridge phase shift angle is between on signals of an upper switch in the first bridge arm and a lower switch in the second bridge arm, and the intra-bridge phase shift angle is between on signals of a lower switch in the first bridge arm and an upper switch in the second bridge arm.

7. The control method according to claim 6, wherein the secondary circuit comprises a third bridge arm and a fourth bridge arm, an upper switch in the third bridge arm and a lower switch in the fourth bridge arm are turned on or off simultaneously, a lower switch in the third bridge arm and an upper switch in the fourth bridge arm are turned on or off simultaneously, and an inter-bridge phase shift angle is between on signals of the upper switch of the first bridge arm and the upper switch of the third bridge arm.

8. A controller, configured to control a resonant dual active bridge conversion circuit, wherein the resonant dual active bridge conversion circuit comprises a primary circuit, at least one secondary circuit, a resonant tank, and a transformer, an alternating current side of the primary circuit is electrically connected to a primary side of the transformer through the resonant tank, the resonant tank comprises a resonant capacitor and a resonant inductor connected in series, and an alternating current side of the secondary circuit is electrically connected to a secondary side of the transformer, wherein the controller comprises:

a sampling unit, configured to sample a voltage on a direct current side of the primary circuit, a voltage on a direct current side of the secondary circuit, and a secondary current;

a voltage gain calculating unit, configured to calculate a voltage gain based on the voltage on the direct current side of the primary circuit and the voltage on the direct current side of the secondary circuit;

a phase shift angle calculating unit, configured to calculate, based on the voltage gain, an intra-bridge phase shift angle $\Phi_1$ of the primary circuit and a phase angle difference $\Phi_2$ between an inter-bridge phase shift angle $\Phi_{ps}$ and an intra-bridge phase shift angle $\Phi_p$, the intra-bridge phase shift angle $\Phi_1$ and the phase angle difference $\Phi_2$ being values at a resonant frequency, and the inter-bridge phase shift angle $\Phi_{ps}$ and the intra-bridge phase shift angle $\Phi_p$ being values at a switching frequency;

a switching frequency calculating unit, configured to calculate the switching frequency of the resonant dual active bridge conversion circuit based on the secondary current; and a PWM generating unit, configured to generate control signals based on the switching frequency, the intra-bridge phase shift angle $\Phi_1$ and the phase angle difference $\Phi_2$ at the resonant frequency, wherein the control signals are used for controlling switches in the primary circuit and the secondary circuit.

9. A converter, wherein the converter comprises:

a resonant dual active bridge conversion circuit, wherein the resonant dual active bridge conversion circuit comprises a primary circuit, at least one secondary circuit, a resonant tank, and a transformer comprising at least one winding on primary and secondary sides respectively, an alternating current side of the primary circuit is electrically connected to a primary winding of the transformer through the resonant tank, wherein the resonant tank comprises a resonant capacitor and a resonant inductor connected in series, one secondary circuit corresponds to one secondary winding of the transformer, and each alternating current side of the secondary circuit is electrically connected to a corresponding secondary winding; and a controller, wherein the controller performs the following control method on the resonant dual active bridge conversion circuit:

sampling a voltage on a direct current side of the primary circuit, a voltage on a direct current side of the secondary circuit, and a secondary current;

calculating a voltage gain based on the voltage on the direct current side of the primary circuit and the voltage on the direct current side of the secondary circuit;

calculating, based on the voltage gain, an intra-bridge phase shift angle $\Phi_1$ of the primary circuit and a phase angle difference $\Phi_2$ between an inter-bridge phase shift angle $\Phi_{ps}$ and an intra-bridge phase shift angle $\Phi_p$, the intra-bridge phase shift angle $\Phi_1$ and the phase angle difference $\Phi_2$ being values at a resonant frequency, and the inter-bridge phase shift angle $\Phi_{ps}$ and the intra-bridge phase shift angle $\Phi_p$ being values at a switching frequency;

calculating the switching frequency of the resonant dual active bridge conversion circuit based on the secondary current; and generating control signals based on the switching frequency, the intra-bridge phase shift angle $\Phi_1$ and the phase angle difference $\Phi_2$ at the resonant frequency, to control switches in the primary circuit and the secondary circuit.

10. The converter according to claim 9, wherein when the voltage gain is less than 1, the intra-bridge phase shift angle $\Phi_1$ and the phase angle difference $\Phi_2$ at the resonant frequency are:

$$\begin{cases} \Phi_2 = \sin^{-1}\dfrac{H_3}{1+M+M_C} \\ \Phi_1 = \cos^{-1}(2M-1) \end{cases}$$

where a value of $H_3$ is determined by a dead time and is a known quantity, M is the voltage gain, and $M_c$ is a per-unit value of a voltage peak value of the resonant capacitor with a positive value of a midpoint voltage of primary side bridge arms as a reference value.

11. The converter according to claim 9, wherein when the voltage gain is greater than or equal to 1, the intra-bridge phase shift angle $\Phi_1$ and the phase angle difference $\Phi_2$ at the resonant frequency are:

$$\begin{cases} \Phi_2 = \sin^{-1}\dfrac{H_3}{1+M+M_C} \\ \Phi_1 = \cos^{-1}\left(\dfrac{2}{M}-1\right) \end{cases}$$

where a value of $H_3$ is determined by a dead time and is a known quantity, M is the voltage gain, and $M_c$ is a per-unit value of a voltage peak value of the resonant capacitor with a positive value of a midpoint voltage of primary side bridge arms as a reference value.

12. The converter according to claim 9, wherein a step of generating control signals based on the switching frequency, the intra-bridge phase shift angle 1 and the phase angle difference $\Phi_2$ at the resonant frequency comprises:

calculating the intra-bridge phase shift angle $\Phi_p$ and the inter-bridge phase shift angle $\Phi_{ps}$ at the switching frequency based on the switching frequency, and the intra-bridge phase shift angle $\Phi_1$ and the phase angle difference $\Phi_2$ at the resonant frequency, wherein the intra-bridge phase shift angle op and the inter-bridge phase shift angle $\Phi_{ps}$ at the switching frequency are respectively:

$$\Phi_p = \frac{f_s}{f_r}\Phi_1, \Phi_{ps} = \frac{f_s}{f_r}(\Phi_1 + \Phi_2)$$

where $f_r$ is the resonant frequency of the resonant tank and $f_s$ is the switching frequency of the switches.

13. The converter according to claim 9, wherein a step of calculating the switching frequency of the resonant dual active bridge conversion circuit based on the secondary current comprises:

comparing the secondary current with a reference current to obtain an amplified difference between the secondary current and the reference current, and calculating the switching frequency based on the amplified difference.

14. The converter according to claim 9, wherein the primary circuit comprises a first bridge arm and a second bridge arm, an intra-bridge phase shift angle is between on signals of an upper switch in the first bridge arm and a lower switch in the second bridge arm, and the intra-bridge phase shift angle is between on signals of a lower switch in the first bridge arm and an upper switch in the second bridge arm.

15. The converter according to claim 14, wherein the secondary circuit comprises a third bridge arm and a fourth bridge arm, an upper switch in the third bridge arm and a lower switch in the fourth bridge arm are turned on or off simultaneously, a lower switch in the third bridge arm and an upper switch in the fourth bridge arm are turned on or off simultaneously, and an inter-bridge phase shift angle is between on signals of the upper switch of the first bridge arm and the upper switch of the third bridge arm.

\* \* \* \* \*